2,964,556
Patented Dec. 13, 1960

2,964,556
CARBAMIC ACID ESTERS

Edward J. Pribyl, Metuchen, and Ervin R. Spitzmiller, Highland Park, N.J., assignors to Olin Mathieson Chemical Corporation, New York, N.Y., a corporation of Virginia No Drawing. Filed Dec. 15, 1958, Ser. No. 780,236

6 Claims. (Cl. 260—482)

This invention relates to new carbamic acid esters and more particularly to the carbamates of 2-aroyl-2,2-dichloroethanols.

The compounds of this invention may be represented by the general formula

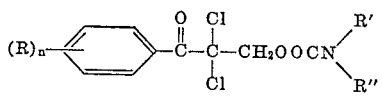

wherein R is selected from the group consisting of hydrogen, lower alkyl, lower alkoxy, halogen, and trifluoromethyl, $n$ is a positive integer less than three, and R' and R" are each selected from the group consisting of hydrogen and lower alkyl. These compounds possess spinal cord depressant activity and thus may be used as muscle relaxants for spastic conditions. For such purposes they are formulated in tablets, capsules, or elixirs and are administered perorally.

The compounds of this invention are prepared by the process of this invention which entails a series of steps. To prepare the free 2-aroyl-2,2-dichloroethanols, whose method of manufacture has never heretofore been disclosed, an $\alpha,\alpha$-dichloroacetophenone (which can be prepared by the general method described in Organic Synthesis, vol. III, p. 538), of the formula

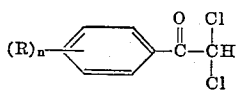

wherein R and $n$ are as hereinbefore defined, is interacted with formaldehyde, preferably in the presence of a basic catalyst, such as an alkali metal carbonate (e.g. sodium bicarbonate) to yield the corresponding 2-aroyl-2,2-dichloroethanol.

The free alcohol can then be coverted to the corresponding carbamate esters by reacting with phosgene, for example, in the presence of an acid acceptor base such as antipyrine and treating with aqueous or liquid ammonia (R' and R" are hydrogen); a mono(lower alkyl)amine, such as methyl amine, ethyl amine, and hexyl amine; or a di(lower alkyl)amine, such as dimethylamine, diethylamine, and dibutylamine. If a substituted carbamate is the desired product, it can also be formed directly by interacting the free alcohol with the desired carbamyl halide or isocyanate, the reaction preferably being conducted at an elevated temperature. Among the suitable starting materials for this series of reactions may be mentioned 2-benzoyl-2,2-dichloroethanol, 2-(lower alkyl)-benzoyl-2,2-dichloroethanols (e.g. 2-m-toloyl-2,2-dichloroethanol, 2 - o,p - xyloyl - 2,2 - dichloroethanol, 2-p-tert-butylbenzoyl-2,2-dichloroethanol, and 2-p-ethylbenzoyl - 2,2 - dichloroethanol); 2 - (lower alkoxy)-2,2-dichloroethanols (e.g. 2-p-anisoyl-2,2-dichloroethanol, 2-p-ethoxybenzoyl-2,2-dichloroethanol and 2-o,o-dimethoxybenzoyl - 2,2 - dichloroethanol); 2 - halobenzoyl-2,2-dichloroethanols (e.g. 2-p-chlorobenzoyl-2,2-dichloroethanol, 2-o-chlorobenzoyl-2,2-dichloroethanol, and 2-p-bromobenzoyl-2,2-dichloroethanol); and 2-trifluoromethylbenzoyl-2,2-dichloroethanols (e.g. 2-p-trifluoromethylbenzoyl-2,2-dichloroethanol).

The process of this invention is illustrated by the following examples (all temperatures being in centigrade):

EXAMPLE 1

2-benzoyl-2,2-dichloroethanol carbamate (a) 2-benzoyl-2,2-dichloroethanol.—A solution of 50.5 g. (0.265 moles) of $\alpha,\alpha$-dichloroacetophenone (sp. 1086) in 200 ml. of 95% ethanol and 35 g. of 38% aqueous formaldehyde (0.43 mole) is stirred in the presence of 1.5 g. of solid sodium bicarbonate for 2 hours at a reaction temperature of 35°–40°. The reaction mixture is then cooled in an incubator bath, filtered and the solvent removed by distillation over a steam batch under vacuum. The undistilled residue is taken up in 300 ml. of ether, the ether solution washed with three 100 ml. portions of water and dried over magnesium sulfate. After filtration the solvent is removed by distillation and the residue of crude product purified by fractionation under reduced pressure giving a yield of about 48 g. (84% of theory) which distills at about 131° at 6 mm. (128° at 4 mm.) and solidifies on standing at room temperature with a melting point of 38°–40°.

Analysis.—Calcd. for $C_9H_8Cl_2O_2$: Calcd. Cl, 32.37; C, 49.39; H, 3.68. Found: Cl, 32.13; C, 49.25; H, 3.72.

(b) 2-benzoyl-2,2-dichloro-3-ethanol carbamate.—A solution of 44 g. (0.2 mole) of 2-benzoyl-2,2-dichloroethanol and 38 g. (0.2 mole) of antipyrine in 100 ml. anhydrous chloroform is placed in a one liter 3 necked flask and a solution of 19.8 g. (0.2 mole) of phosgene in 120 ml. of toluene is added dropwise with stirring under anhydrous conditions at a reaction temperature of 0°–5°. After the addition which requires 20 minutes the reaction mixture is allowed to rise to room temperature with stirring over a period of 30 minutes. After remaining at room temperature without stirring overnight 300 ml. of anhydrous ether is added to insure complete separation of the antipyrine hydrochloride which has crystallized from solution overnight. The latter is recovered by suction filtration and weighs about 45.5 g. (theory). The filtrate is cooled to 10° by an ice water bath and stirred vigorously as 200 ml. of 28% ammonium hydroxide is added dropwise at a reaction temperature of 10° to 20°. After stirring 2 hours at 15° the reaction mixture is placed in a separatory funnel and the alkaline aqueous phase is removed. The organic layer is washed five times with 100 ml. portions of water, dried over magnesium sulfate, filtered and the solvents removed by distillation over a steam bath. The toluene fraction is removed by distillation under vacuum after which the undistilled residue of about 55 g. of crude product solidifies at room temperature. After trituration with hexane and air drying the product weighs about 47 g. (89% of theory) and has a melting point of about 95–105°. It is purified to a constant melting point of about 110–111° by two recrystallizations from 50% aqueous ethanol. (A third recrystallization of a sample from benzene also has a melting point of about 110–111°). The final yield of pure product weighs about 34.5 g. or 65% of theory.

Analysis.—Calcd. for $C_{10}H_9Cl_2NO_3$: Calcd. C, 45.82; N, 3.46; Cl, 27.05; N, 5.34. Found: C, 46.16; H, 3.68, Cl, 25.83; N, 5.45.

EXAMPLE 2

2-p-ethoxybenzoyl-2,2-dichloroethanol carbamate 52 g. of $\alpha,\alpha$-dichloro-p-ethoxyacetophenone is prepared by reaction of 57 g. of p-ethoxyacetophenone with chlorine following the procedure described in Organic Synthesis, vol. III, p. 538. By substituting 52 g. of α,α-dichloro-p-ethoxyacetophenone for the α,α-dichloroacetophenone in the procedure of step *a* of Example 1 and following the procedures of steps *a* and *b* of the example, 2-p-ethoxybenzoyl-2,2-dichloroethanol carbamate is obtained.

EXAMPLE 3

*2-p-tert-butylbenzoyl-2,2-dichloroethanol carbamate*

Following the procedure of Example 2 but substituting 61 g. of p-tert-butylacetophenone for the p-ethoxyacetophenone, there is obtained 2-p-tert-butylbenzoyl-2,2-dichloroethanol carbamate.

Similarly, by substituting other substituted acetophenones for the p-ethoxyacetophenone in the procedure of Example 2, the corresponding carbamic acid esters are obtained. m-Methylacetophenone, o,p-dimethylacetophenone, p-methoxyacetophenone, o,o-dimethoxyacetophenone, p-chloroacetophenone, and p-trifluoromethylacetophenone yield the carbamic acid esters of 2-m-tololyl-2,2-dichloroethanol, 2-o,p-xyloyl-2,2-dichloroethanol, 2-m-anisoyl-2,2-dichloroethanol, 2-o,o-dimethoxybenzoyl-2,2-dichloroethanol, 2-p-chlorobenzoyl-2,2-dichloroethanol, and 2-p-trifluoromethylbenzoyl-2,2-dichloroethanol, respectively.

EXAMPLE 4

*2-benzoyl-2,2-dichloroethanol dimethylcarbamate*

A mixture of 110 g. (0.50 mole) of 2-benzoyl-2,2-dichloroethanol and 53.5 g. (0.50 mole) of dimethyl carbamyl chloride contained in a 500 ml. flask fitted with a reflux condenser and calcium chloride tube is heated on a steam-bath. Upon reaching a temperature of about 65° an exothermic reaction occurs. When the reaction subsides the mixture is heated for a period of four hours or until hydrogen chloride ceases to evolve. The mixture is cooled and extracted with 2 x 300 ml. ether. The ethereal layers are combined and washed with 2 x 200 ml. water; 2 x 200 ml. of 2% sodium bicarbonate solution followed by 2 x 200 ml. of water. The ether extract is finally dried over magnesium sulfate. The ether is removed to give a product weighing about 242 grams.

EXAMPLE 5

*2-benzoyl-2,2-dichloroethanol ethylcarbamate*

A mixture of 22 g. (0.10 mole) of 2-benzoyl-2,2-dichloroethanol and 7.1 g. (0.10 mole) of ethyl isocyanate is allowed to stand at room temperature overnight. The mixture is then heated on the steam-bath for two hours, cooled and poured into 200 ml. water. The oil is extracted with 2 x 100 ml. of ether. The ether extracts are combined and dried over magnesium sulfate. The ether is removed and then residue is fractionated under reduced pressure to give about 18 g. of material.

EXAMPLE 6

*2-benzoyl-2,2-dichloroethanol ethylcarbamate*

To a solution of 22 g. (0.10 mole) of 2-benzoyl-2,2-dichloroethanol is added dropwise 200 ml. of ether solution containing 10 g. of phosgene. After the addition the solution is stirred for 1 hour followed by the addition of 10 g. of triethylamine. The mixture is filtered and the filtrate is stirred for three hours with 70 g. of 76% aqueous ethylamine solution. The ethereal layer is separated, washed with 2 x 100 ml. 5% hydrochloric acid; 2 x 200 ml. water and dried over magnesium sulfate. The ether is removed to give about 14.5 g. of product.

The invention may be variously otherwise embodied within the scope of the appended claims.

What is claimed is:

1. A compound of the formula

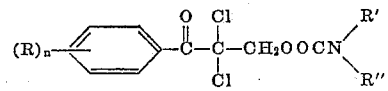

wherein R is selected from the group consisting of hydrogen, lower alkyl, lower alkoxy, chlorine, bromine and trifluoromethyl, $n$ is a positive integer less than three, and R' and R" are each selected from the group consisting of hydrogen and lower alkyl.

2. 2-benzoyl-2,2-dichloroethanol carbamate.
3. 2-p-ethoxybenzoyl-2,2-dichloroethanol carbamate.
4. 2-p-tert-butylbenzoyl-2,2-dichloroethanol carbamate.
5. 2-benzoyl-2,2-dichloroethanol dimethylcarbamate.
6. 2-benzoyl-2,2-dichloroethanol ethylcarbamate.

References Cited in the file of this patent

UNITED STATES PATENTS

| | | |
|---|---|---|
| 2,197,479 | Meigs | Apr. 16, 1940 |
| 2,816,930 | Lambrech | Dec. 17, 1957 |
| 2,848,459 | Pribyl et al. | Aug. 19, 1958 |

OTHER REFERENCES

Degering: An Outline of Organic Nitrogen Compounds, pages 549–50, 1950.